United States Patent [19]

Apfel

[11] Patent Number: 4,987,403
[45] Date of Patent: Jan. 22, 1991

[54] SELF CONTAINED DEVICE FOR GIVING AUDIBLE MESSAGES TO OCCUPANTS OF A VEHICLE

[76] Inventor: Stephen M. Apfel, P.O. Box 1134, Brooklyn, N.Y. 11240

[21] Appl. No.: 465,774

[22] Filed: Jan. 16, 1990

[51] Int. Cl.$^5$ .............................................. B60Q 1/00
[52] U.S. Cl. .................................. 340/457; 340/457.1; 340/384 R; 340/309.15; 340/692; 340/693
[58] Field of Search ................. 340/457, 457.1, 384 R, 340/384 E, 392, 693, 309.15, 309.2, 309.3, 692

[56] References Cited

U.S. PATENT DOCUMENTS

| | | | |
|---|---|---|---|
| 3,947,812 | 3/1976 | Lee et al. | 340/457.1 |
| 4,222,028 | 9/1980 | Danchilla | 340/457 |
| 4,346,364 | 8/1982 | Takagi et al. | 340/457 |
| 4,755,789 | 7/1988 | Paschal | 340/457.1 |

*Primary Examiner*—Donnie L. Crosland
*Attorney, Agent, or Firm*—Michael I. Kroll

[57] ABSTRACT

A self contained device for giving audible messages to occupants of a vehicle is disclosed. The device includes a housing having a top, a side, and a front, a power source disposed remotely from the housing, a VELCRO ® strap disposed on the top of the housing so that the self contained audible message device can be mounted under the dashboard of the vehicle, a first negative electrode disposed from the housing, a first positive electrode disposed from the housing, the first positive electrode and the first negative electrode together connecting the present invention to the remote power source, an normally open switch disposed remotely from the housing, a light emitting diode, a second negative electrode disposed from the housing, and a second positive electrode disposed from the housing, the seecond positive electrode and the second negative electrode together connecting the normally open switch to the light emitting diode (L.E.D.).

12 Claims, 1 Drawing Sheet

SELF CONTAINED DEVICE FOR GIVING AUDIBLE MESSAGES TO OCCUPANTS OF A VEHICLE

BACKGROUND OF THE INVENTION

1. Field of the Invention

The present invention relates to a device for giving audible messages.

More particularly, the present invention relates to a self contained device for giving audible messages to occupants of a vehicle.

2. Description of the Prior Art

The use of a eat belt in an automobile for a means of preventing serious injury and death has been an undisputed fact since their first introduction. Since then, considerable energies have been focused on encouraging non-wearers to wear seat belts. These efforts have included extensive promotional campaigns, vehicle-installed warning buzzers and lights, passive restraint systems, and even fines. Unfortunately, thousands of lives are still lost every year that could have been saved by buckled seat belts.

Many people simply forget to wear their seat belts. Vehicle-installed warning lights and buzzers were intended as reminders to otherwise forgetful passengers. These indicators were viewed by many motorists as annoyances and were, in many cases, disconnected, thereby defeating their purpose.

Known synthesized voice systems are available and are largely well-received by most people. Telephone numbers are being given by synthesized voices, soda machines are suggesting different selections, and not virtually all car manufacturers offer automobiles with a synthesized voice to warn the motorist of various conditions, such as keys left in the ignition, 10W oil, and the like. The synthesized voice is being used to remind motorists to secure their seat belts. This approach is apparently better received and is resulting in a considerably greater number of motorists securing their seat belts.

While the use of synthesized voice systems for warning motorists to secure their set helt has been proven successful and necessary, a problem exists with the millions of older vehicles on the roads today with systems which are inadequate, disconnected or nonexistent.

Another consideration is that a driver may want to warn his passengers to buckle their seat belts well into their journey. Commercially available systems do not give the driver an opportunity to re-announce the warning to these delinquent passengers.

Accordingly, there exists a need for providing vehicles, seat belt systems that have the ability to be operated at will.

Numerous innovations for self contained devices or giving audible messages to occupants of vehicles have been provided in the prior art that are adapted to he used. Even though these innovations may be suitable for the specific individual purposes to which they address they would no the suitable for the purposes of the present invention as heretofor described.

SUMMARY OF THE INVENTION

Accordingly, it is an object of the present invention to provide a self contained device for giving audible messages to occupants of a vehicle, that avoids the disadvantages of the prior art.

More particularly, it is an object of the present invention to provide in accordance with the illustrative embodiments demonstrating features, and advantages of the present invention a reminder device. Power is supplied to the reminder device when the ignition switch is turned on.

The reminder device of the present invention includes a housing circuit means contained within the housing This circuit means includes a speech synthesizer for generating an audible message. The device further includes means to electrically interconnect the circuit means and the electrical outlet. Thus, the speech synthesizer is activated to generate the audible messages when the ignition switch is turned on. The reminder device still further includes a normally open switch that is electrically connected to the circuit means. The momentary closure of the normally open switch deactivates the speech synthesizer to halt the audible message once the speech synthesizer has been activated by turning on the ignition switch. Thus, the reminder device is entirely self contained and adapted to be installed in the vehicle.

The use of such a device reminds the driver to respond to a recorded message which could indicate the safety benefits, or the legal responsibility of such. A remove switch of the system would be pressed to deactivate the message. This switch, which could alternatively be used to activate the message, would be pressed when passengers do not secure their seat belts. This gives the system an advantage over the systems currently being used today since it gives the driver the ability to remind other passengers.

In keeping with these objects, and with others which will become apparent hereinafter, one feature of the present invention resides, briefly stated, in a self contained device for giving audible messages comprising, a housing having a top, a side, and a front, a power source disposed remotely from the housing, a VELCRO® strap disposed on the top of the housing so that the self contained device giving audible messages can be mounted under the dashboard of the vehicle, a first negative electrode disposed from the housing, a first positive electrode disposed from the housing, the first positive electrode and the first negative electrode together connecting the self contained device for giving audible messages to the remote power source, a normally open switch disposed remotely from the housing, a light emitting diode, a second negative electrode disposed from the housing, and a second positive electrode disposed from the housing, the second positive electrode and the second negative electrode together connecting the normally open switch to the light emitting diode.

When the self contained device for giving audible messages to occupants of a vehicle is designed in accordance with the present invention, the driver has an opportunity to re-announce the warning to the delinquent passengers.

In accordance with another feature of the present invention, it further comprises a speaker disposed in the side of the housing.

Another feature of the present invention is that it further comprises a variable resistor switch disposed on the front of the housing so that the intervals for starting the messages are also manually controllable.

Yet another feature of the present invention is that it further comprises a volume control switch disposed on the front of the housing so that the audible volume of the messages can be controlled.

Still another feature of the present invention is that the power source can be the cigarette lighter disposed in the vehicle.

Yet still another feature of the present invention is that at further comprises a voice synthesizer that provides the messages through the speaker The novel features which are considered characteristic for the invention are set forth in particular in the appended claims. The invention itself however, both as to its construction and its method of operation, together with additional objects and advantages thereof, will be best understood from the following description of the specific embodiments when read in connection with the accompanying drawing.

BRIEF DESCRIPTION OF THE DRAWING

In th drawing, wherein similar reference numerals denote similar features throughout the several views.

LIST OF REFERENCE NUMERALS UTILIZED IN THE DRAWING

Figure 1:
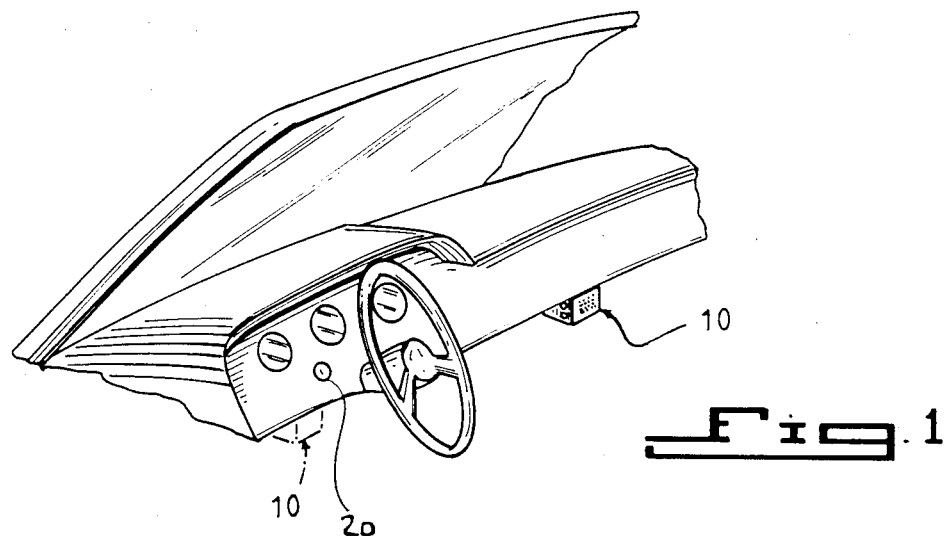
FIG. 1 is a perspective view of the self-contained device for giving audible and visual messages to occupants of a vehicle incorporating the present invention mounted underneath the dashboard of the vehicle.
Figure 2:
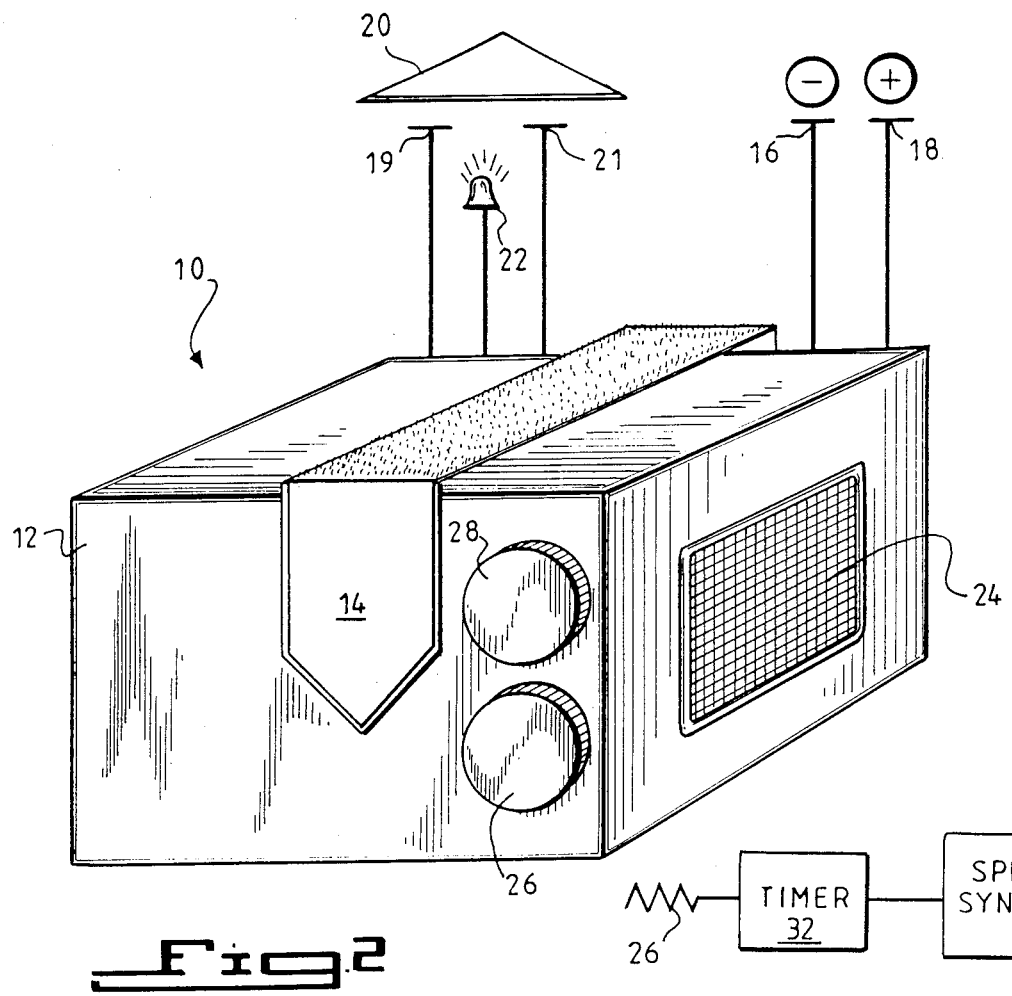
FIG. 2 is an oblique view of the self-contained device for giving audible and visual messages to occupants of a vehicle incorporating the present invention; and, FIG. 3 is a schematic diagram of the interval circuitry means for controlling the intervals of time in which the audible message of the invention is to be repeated.

10—self contained device for giving audible messages to occupants of a vehicle
12—housing case
—VELCRO® support strap
16—negative lead
18—positive lead
19—another negative lead
20—normally open switch
21—another positive lead
22—light emitting diode (L.E.D.)
24—speaker
26—variable resistor switch
28—volume control
30—voltage regulator
32—timer device
34—speech synthesizer

DETAILED DESCRIPTION OF THE PREFERRED EMBODIMENT

Referring to the sole FIGURE in which like numerals indicate like parts, the general overall structure of the present invention 10 is shown with a housing 12 containing a speaker 24 and circuitry (not shown) for producing a voice message. A VELCRO® support strap 14 secures th housing 12 to the underside of the dashboard (not shown)

The present invention 10 receives power from the vehicle through negative lead 16 and positive lead 18 which may terminate at their ends at an adaptor (not shown) for insertion within a vehicle cigarette lighter. Alternatively, negative lead 16 and positive lead 18 may be connected to the power line of an accessory (not shown). The normally open switch 20 is remotely connected to the present invention 10 and provides manual activation or deactivation of the message.

The present invention is is easily retrofitted into vehicle that is not equipped with such a warning device. The negative lead 19 may be attached to any appropriate structure under the dashboard as long as it is spaced apart from the housing 12 a sufficient distance to assure that the speaker 24 will be free from obstructions The VELCRO® support strap 14, of suitable length secures the present invention 10 to the vehicle. The negative lead 16 and the positive lead 18 are attached to respective positive and negative connections within the vehicle. With the proper adaptor the present invention 10 and could the plugged into a vehicle cigarette lighter socket or into the power wiring of an accessory, such as a radio, heater, signal lights, etc. or the like. Another positive lead 21 is connected to any wire that supplies 12V to an accessory such as the radio heater, cigarette lighter, signal lights, etc or the like. In this way the present invention 10 is activated when the ignition or accessory switch (not shown) is in the "ON" position, and is deactivated when the ignition or accessory switch is in the "OFF" position, while using a common ground.

The normally open switch 20 may take various forms, but will still be easily operable by the driver. The normally opened switch 20 is disposed at a convenient, remote location and is electrically connected to the present invention 10. This enables the driver for example to attach the present invention 10 in the center of the bottom of the dashboard where a floor hump (only on rear wheel and four wheel drive vehicles) obscures free space from the dashboard center so that the normally open switch 20 must be mounted to the lower-left-hand portion of the dashboard for convenient reach. The normally open switch 20 is in illuminated normally open momentary switch, which is approximately the size of a quarter, and glues to any location convenient to the driver, as discussed, supra.

The present invention 10 is suspended by the strap 14 from any convenient bracket or wire harness under the dashboard. The present invention 10 is suspended high enough so as to allow only speaker 24 to be exposed and facing the occupants of the vehicle.

In normal operation, power is supplied to the present invention 10 through the negative lead 16 and the positive lead 18 when the ignition is switched on, as, for example, when the vehicle is started. The negative lead 16 and the positive lead 18 are 20 gauge wire and are approximately four feet long so as to provide sufficient length to mount the normally open switch 20 in any convenient location. A synthesized voice will begin to warn the driver by repeating a message. The message will continue to be repeated until the normally open switch 20 is pressed.

The driver of the vehicle may press the normally open switch 20 before the message is fully announced. The circuitry provides that subsequent messages would, nonetheless start at the beginning. In this normal mode, the single pressing of the normally open switch 20 will deactivate the present invention 10.

The present invention provides an advantage over systems currently installed in vehicles today, by giving the driver the ability to activate the present invention 10 whether or not the ignition has been switched off and back on. If, for example, a passenger enters the vehicle while the engine is already running, the driver may manually activate the present invention 10 by pressing the normally open switch 20 once, to start the message. The normally open switch 20 acts as a toggle to alternately turn the present invention 10 on and off, so that once the new passenger has received the message, the normally open switch 20 can be pressed a second time to stop the message.

The individual circuits of the present invention 10 include a voltage regulator 30 which converts the vehicle voltage to the needed working voltage and further protects the present invention 10 from surges in power. A speech processor is provided for creating the message and may take the form of a preprogrammed ROM, while a low pass filter sends the signal to the audio amplifier for driving the speaker 24.

The normally open switch 20 is connected to the speech processor and provides manual activation or deactivation of the message. A light emitting diode (L.E.D.) 22 may be installed between the power source and the circuitry for protection against reverse voltage spikes which are known to occur in vehicle electrical systems.

Additionally, the present invention 10 is provided with a volume control 28 and a variable resistor switch 26. The volume control 28 regulates the audible message volume. The variable resistor switch 26 regulate the Intervals for starting the message.

Figure 3:
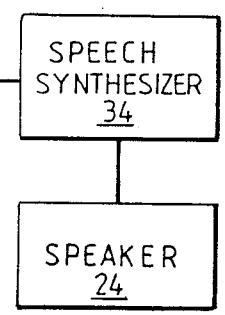

FIG. 3 is a schematic diagram illustrating the circuitry of the interval circuitry timing means for controlling the time interval over which the audible message is to be repeated to passengers of the vehicle. In addition to the other features heretofore discussed, the intervals circuitry means includes a timer device 32 and speech synthesizer 34.

It will be understood that each of the elements described above or two or more together may also find a useful application in other types of constructions differing from the type described above.

While the invention has been illustrated and described as embodied in a self contained device for giving audible messages to occupants of a vehicle it is not intended to be limited to the details shown, since it will be understood that various omissions, modifications, substitutions and changes in the forms and details of the device illustrated and in its operation can be made by those skilled in the art without departing in any way from the spirit of the present invention Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters patent is set forth in the appended claims:

1. A self contained device for giving audible messages to occupants of a vehicle, comprising:
    (a) a housing having a top, a side, and a front;
    (b) a power source disposed remotely from said housing;
    (c) a hook and loop fastening strap disposed on said top of said housing so that the self contained device for giving audible messages to occupants of the vehicle can be mounted under the dashboard of the vehicle;
    (d) a first negative electrode disposed from said housing;
    (e) a first positive electrode disposed from said housing, said first positive electrode and said first negative electrode together connecting the self contained device for giving audible messages to said remote power source;
    (f) a normally open switch disposed remotely from said housing;
    (g) a light emitting diode;
    (h) a second negative electrode disposed from said housing; and
    (i) a second positive electrode disposed from said housing, said second positive electrode and said second negative electrode together connecting said normally open switch to said light emitting diode.

2. A device as defined in claim 1, further comprising a speaker disposed in said side of said housing.

3. A device as defined in claim 1, further comprising volume control switch disposed on said front of said housing so that the audible message volume can be controlled.

4. A device as defined in claim 1, wherein said power source is the cigarette lighter in the vehicle.

5. A device as defined in claim 2, further comprising a voice synthesizer that provides the messages through said speaker.

6. A device as defined in claim 2, further comprising interval control means for starting the audible messages at pre-determined time intervals.

7. A device as defined in claim 6, wherein said interval control means includes a variable resistor switch disposed on said front of said housing.

8. A self-contained device for giving audible messages to occupants of a vehicle, comprising:
    (a) a housing having a top, a side, and a front;
    (b) a power source disposed remotely from said housing;
    (c) a hook-and-loop fastening strap disposed on said top of said housing so that the self-contained device for giving audible messages to occupants of the vehicle is mountable under a dashboard of the vehicle;
    (d) a first negative electrode disposed from said housing;
    (e) a first positive electrode disposed from said housing, said first positive electrode and said first negative electrode together connecting the self-contained device from giving audible messages to said remote power source;
    (f) a normally open switch disposed remotely from said housing;
    (g) a light emitting diode;
    (h) a second negative electrode disposed from said housing;
    (i) a second positive electrode disposed from said housing, said second positive electrode and said second negative electrode together connecting said normally open switch to said light emitting diode; and,
    (j) interval control means for starting the audible messages at pre-determined time intervals, said interval control means having a variable resistor switch disposed on said front of said housing.

9. A device as defined in claim 8, further comprising a speaker disposed in said side of said housing.

10. A device as defined in claim 9, further comprising a voice synthesizer that provides the messages through said speaker.

11. A device as defined in claim 9, further comprising a volume control switch disposed on said front of said housing so that the audible message volume can be controlled.

12. A device as defined in claim 8, wherein said power source is the cigarette lighter in the vehicle.

* * * * *